(12) United States Patent
Katayama et al.

(10) Patent No.: US 6,782,185 B2
(45) Date of Patent: Aug. 24, 2004

(54) OPTICAL VARIABLE ATTENUATOR AND OPTICAL MODULE

(75) Inventors: Makoto Katayama, Yokohama (JP); Tomohiko Kanie, Yokohama (JP); Hiroshi Suganuma, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/331,660

(22) Filed: Dec. 31, 2002

(65) Prior Publication Data
US 2004/0005135 A1 Jan. 8, 2004

Related U.S. Application Data
(60) Provisional application No. 60/393,129, filed on Jul. 3, 2002.

(30) Foreign Application Priority Data
Jul. 3, 2002 (JP) ........................ P2002-194496

(51) Int. Cl.[7] ............................ G02B 6/35; G02B 6/28; G02B 6/293
(52) U.S. Cl. .............................. 385/140; 385/18; 385/24
(58) Field of Search .......................... 385/16–18, 140, 385/24

(56) References Cited

U.S. PATENT DOCUMENTS

| | | | |
|---|---|---|---|
| 3,195,405 A | 7/1965 | Clark et al. | |
| 4,192,573 A | 3/1980 | Brown, Jr. | |
| 4,198,118 A | 4/1980 | Porter | |
| 4,516,827 A | 5/1985 | Lance et al. | |
| 5,915,063 A | 6/1999 | Colbourne et al. | |
| 6,149,278 A | 11/2000 | Mao et al. | |
| 6,195,478 B1 * | 2/2001 | Fouquet | 385/17 |
| 6,275,320 B1 | 8/2001 | Dhuler et al. | |
| 6,473,540 B1 | 10/2002 | Augustsson | |
| 6,493,488 B1 | 12/2002 | Islam et al. | |
| 6,512,432 B2 * | 1/2003 | Suzuki | 333/262 |
| 6,580,858 B2 * | 6/2003 | Chen et al. | 385/48 |
| 2002/0009256 A1 | 1/2002 | Chertkow et al. | |
| 2002/0031324 A1 | 3/2002 | Cao et al. | |
| 2002/0061159 A1 * | 5/2002 | Dahmani et al. | 385/18 |
| 2002/0131712 A1 | 9/2002 | Markwardt et al. | |
| 2002/0150378 A1 | 10/2002 | Heffner et al. | |

FOREIGN PATENT DOCUMENTS

| | | |
|---|---|---|
| JP | 57-96401 | 12/1981 |
| JP | 59-168120 | 11/1984 |

OTHER PUBLICATIONS

Ming Wu, Micromching for Optical and Optoelectronic Systems, Nov. 1997, Proceedings of the IEEE, vol. 85, No. 11, pp. 1833–1856.*

(List continued on next page.)

Primary Examiner—Hemang Sanghavi
Assistant Examiner—Omar Rojas
(74) Attorney, Agent, or Firm—McDermott Will & Emery LLP (57) ABSTRACT

An optical variable attenuator has a planar waveguide, which is provided with optical waveguides forming an input optical line A and an output optical line B. A cantilever is disposed at the upper face of the planar waveguide, whereas a movable mirror for reflecting light passing through the input optical line A toward the output optical line B is secured to the leading end part of the cantilever. An electrode is disposed at the upper face of the planar waveguide. The cantilever and the electrode are connected to each other by way of a voltage source. The voltage source applies a voltage between the cantilever and the electrode, so as to generate an electrostatic force therebetween, which flexes the leading end side of the cantilever toward the electrode. As a consequence, the movable mirror moves toward the electrode.

11 Claims, 5 Drawing Sheets

OTHER PUBLICATIONS

"Technical Report Of IEICE, PS2001–31", "Optical Characteristics of MEMS–VOA", Masahito Morimoto and Kouki Sato, Furukawa Electric Co. Ltd., Chiba, Japan., pp. 19–24,(with English abstract).

Tomohiko Kanie et al., "MEMS Optical Switch Array", Technical Report of IEICE, The Institute of Electronics, Information and Communication Engineers, (May 2002), pp. 21–26 (w/English Translation).

T. Kanie et al., "PLC Packaged Type 2×2 Optical Switch Array", The Institute of Electronics, information and Communication Engineers General Conference 2002, p. 140 (w/English Translation).

* cited by examiner

OPTICAL VARIABLE ATTENUATOR AND OPTICAL MODULE

CROSS-REFERENCE TO RELATED APPLICATION

This application claims priority to Provisional Application Ser. No.60/393,129 filed on Jul. 3, 2002, which is/are hereby incorporated by reference in its/their entirety.

BACKGROUND OF THE INVENTION

1. Field of the Invention

The present invention relates to an optical variable attenuator and an optical module which are used in optical communications and the like.

2. Related Background Art

Known as an example of conventional optical variable attenuators is one disclosed in the IEICE Technical Report, PS2001-31. The optical variable attenuator described in the publication is one in which two optical fibers oppose each other, whereas a shutter is put into/out of the space therebetween, so as to control the optical attenuation amount.

The above-mentioned prior art uses two shutters in order to reduce the polarization-dependent loss (wavelength dependence of attenuation amount) caused by the diffraction of optical beams at edge parts of a shutter. In this case, however, actuators for separately driving the two shutters are necessary, whereby the structure of optical variable attenuator becomes complicated/bulky.

SUMMARY OF THE INVENTION

It is an object of the present invention to provide an optical variable attenuator and an optical module which, while in a simple structure, can reliably reduce the polarization-dependent loss.

The optical variable attenuator of the present invention comprises a base member having an input optical line and an output optical line; a movable mirror for reflecting light passing through the input optical line toward the output optical line; and driving means for moving the movable mirror.

When the movable mirror is located at a predetermined position in such an optical variable attenuator, the light from the input optical line is totally reflected by the movable mirror so as to be guided to the output optical line, whereby a state with the lowest optical attenuation amount is attained. When the movable mirror is moved by the driving means from this state, only a part of the light from the input optical line is reflected by the movable mirror, whereby the optical attenuation amount increases. When the movable mirror reaches a position completely displaced from the input optical line and output optical line, the movable mirror reflects no light at all, so that no reflected light is guided to the output optical line, whereby a state with infinite attenuation is attained. Since the optical variable attenuator of the present invention utilizes the reflection of light effected by a movable mirror, it is free from influences of diffraction of light at edge parts of the movable mirror. Also, a single movable mirror is enough, unlike cases where a simple shutter is used as a member for changing the optical attenuation amount. Therefore, a simple structure can reliably reduce the polarization-dependent loss caused by light diffraction effects. In this case, the polarization-dependent loss at an optical attenuation amount of 10 dB can be made smaller than 0.2 dB.

Preferably, the movable mirror is formed by a microelectromechanical technology. This can reduce the size of the movable mirror, whereby the optical variable attenuator can be made smaller.

Preferably, the input optical line and output optical line are formed by an optical waveguide, the base member is provided with a groove connecting with the input optical line and the output optical line; and the movable mirror is provided so as to be movable in a state inserted in the groove. When the input and output optical lines are formed by an optical waveguide as such, the base member having the input and output optical lines can easily be made by using a semiconductor manufacturing technology, whereby the cost can be cut down.

Preferably, in this case, the input optical line and output optical line form a virtual intersection angle of at least 9 degrees therebetween. Here, the virtual intersection angle refers to an angle at which the input and output optical lines intersect if they are extended straight as they are. When such a virtual intersection angle is at least 9 degrees, the light returning to the input optical line after being reflected by the movable mirror is reduced, whereby the optical loss caused by return light can be suppressed to a low level.

Preferably, the groove is filled with a matching oil having a refractive index on a par with that of the optical waveguide. This can reduce the optical insertion loss between the input and output optical lines and the movable mirror.

Preferably, the movable mirror is attached to a cantilever supported on the base member, whereas the driving means has an electrode disposed on the base member and means for generating an electrostatic force between the cantilever and the electrode. Such a configuration driving the movable mirror by utilizing an electrostatic force makes it unnecessary for currents to flow, whereby the power consumption can be lowered.

Preferably, in this case, the cantilever is provided with a plurality of first teeth, whereas the electrode is provided with a plurality of second teeth alternately inserted between the first teeth. This increases the surface areas of the cantilever and electrode, whereby a large electrostatic force can be generated between the cantilever and electrode with a low voltage applied thereto. Also, since the cantilever and the electrode are disposed closer to each other, the linearity of amount of movement of the movable mirror with respect to the applied voltage, i.e., the linearity of optical attenuation amount with respect to the applied voltage, improves. Therefore, it becomes easier to control the optical attenuation amount.

Preferably, the movable mirror, cantilever, and electrode are formed from Si having a conductivity, whereas the movable mirror has a surface coated with one of Au, Ag, and Al. When the movable mirror, cantilever, and electrode are formed from Si having a conductivity as such, these structures can be made inexpensively. When a surface of the movable mirror is coated with one of Au, Ag, and Al, a high-performance movable mirror with a favorable reflectance can be obtained.

The optical module of the present invention comprises the optical variable attenuator mentioned above. When provided with the optical variable attenuator adjusting the optical attenuation amount by utilizing the reflection of light caused by the movable mirror as such, the polarization-dependent loss caused by light diffraction effects can reliably be reduced by a simple structure as mentioned above.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, preferred embodiments of the optical variable attenuator and optical module in accordance with the present invention will be explained with reference to the drawings.

Figure 1:
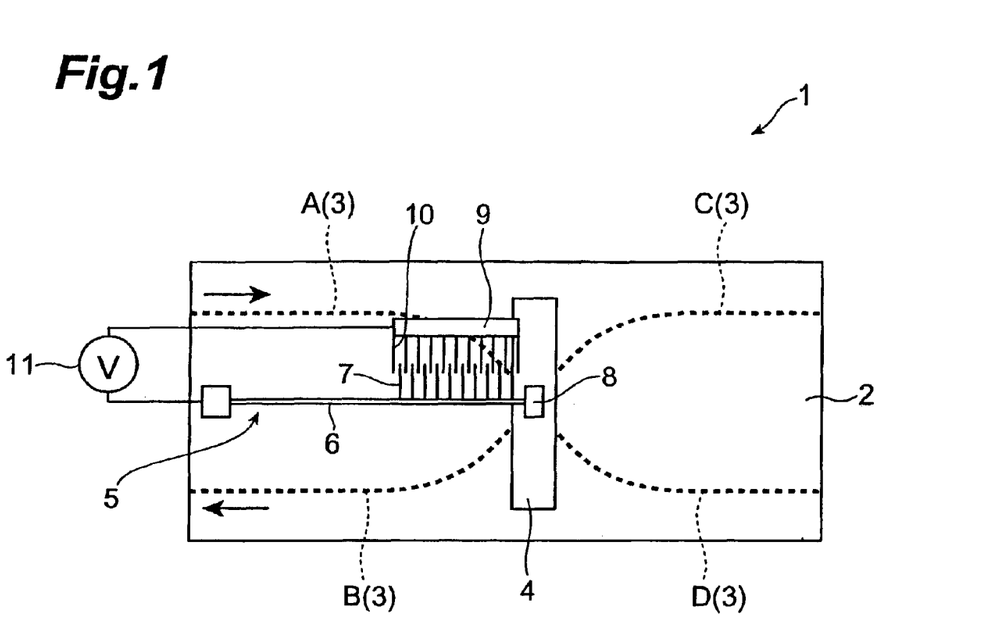
FIG. 1 shows a plan view showing an embodiment of the optical variable attenuator in accordance with the present invention.
Figure 2:
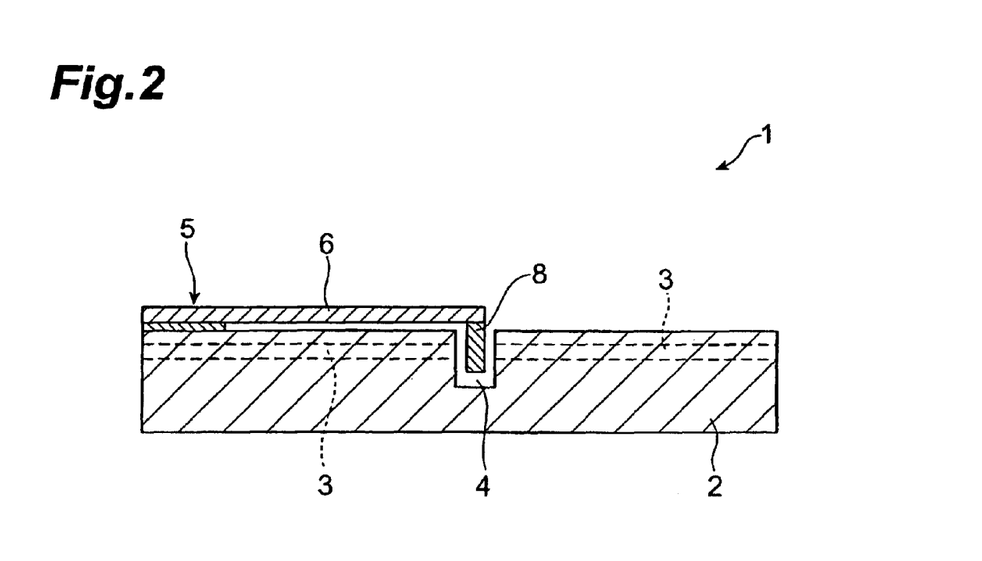
FIG. 2 shows a vertical sectional view of the optical variable attenuator shown in FIG. 1.

FIG. 1 is a plan view showing an embodiment of the optical variable attenuator in accordance with the present invention, whereas FIG. 2 is a vertical sectional view of the optical variable attenuator. In FIGS. 1 and 2, the optical variable attenuator 1 of this embodiment has a planar waveguide 2, which is provided with optical waveguides 3 forming optical lines A to D. Here, the optical line A constitutes an input optical line, whereas the optical line B constitutes an output optical line. The planar waveguide 2 is provided with a groove 4 extending widthwise of the planar waveguide 2 and connecting with the optical lines A to D.

The planar waveguide 2 having such optical lines A to D and groove 4 are manufactured as follows: First, the planar waveguide 2 is formed with two optical waveguides 3 in a cross. Subsequently, the groove 4 is formed at the intersection of the two optical waveguides 3 by using reactive ion etching (RIE), for example. This forms the optical lines A to D.

Disposed on the planar waveguide 2 is an actuator structure 5 formed by use of a microelectromechanic system (MEMS) technology. The actuator structure 5 has a cantilever 6 supported on the upper face of the planar waveguide 2, whereas the cantilever 6 extends from one end part of the planar waveguide 2 to the position of the groove 4. The leading end side of the cantilever 6 is provided with a plurality of teeth 7. Preferably, from the viewpoint of cutting down the cost, the cantilever 6 is formed from silicon (Si) having a conductivity.

Secured to the leading end part of the cantilever 6 is a movable mirror 8 for reflecting light passing through the input optical line A toward the output optical line B. The movable mirror 8 is configured so as to enter the groove 4 of the planar waveguide 2. For example, the movable mirror 8 has dimensions with a thickness of 30 $\mu$m, a height of 50 $\mu$m, and a width of 50 $\mu$m.

Figure 3:
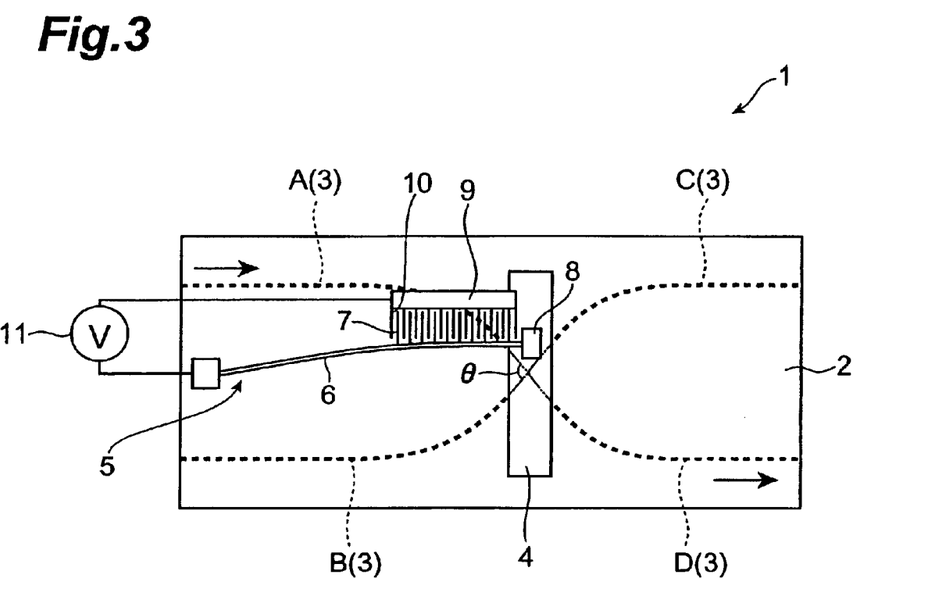
FIG. 3 shows a plan view showing an operating state of the actuator structure shown in FIG. 1.

Here, when the optical lines A, D and the optical lines B, C are connected by lines, respectively, the angle θ at which these lines intersect (virtual intersection angle between the input optical line A and output optical line B) is preferably at least 9 degrees (see FIG. 3). As a consequence, when the light from the input optical line A is reflected by the movable mirror 8, thus reflected light hardly returns to the input optical line A, whereby the optical loss (return loss) caused by return light (leakage light) is reduced. For reducing the widthwise size of the planar waveguide 2 while securing a desirable optical reflectance, it is preferred that the virtual intersection angle θ between the input optical line A and output optical line B fall within the range of 9 to 20 degrees.

The movable mirror 8 is formed from Si having a conductivity as with the cantilever 6. A surface of the movable mirror 8 is coated with gold (Au), silver (Ag), aluminum (Al), or the like. This yields a higher reflectance with respect to light in wavelength bands for optical communications such as infrared light, whereby the optical insertion loss with respect to the output optical line B can be lowered.

The actuator structure 5 has an electrode 9 disposed at the upper face of the planar waveguide 2. The electrode 9 is provided with a plurality of teeth 10 alternately inserted between the teeth 7. The electrode 9 is formed from Si having a conductivity as with the cantilever 6.

Such an actuator structure 5 composed of the cantilever 6, movable mirror 8, and electrode 9 is manufactured by inductively-coupled-plasma reactive ion etching (ICP-RIE), for example.

The foregoing planar waveguide 2 and actuator structure 5 are contained in a package (not depicted) together with fiber arrays (not depicted) arranged on both end sides of the planar wave guide 2. The package is filled with a matching oil (e.g., silicone resin) having a refractive index on a par with that of the optical waveguide 3. As a consequence, the groove 4 of the planar waveguide 2 is also filled with the matching oil. Therefore, no discontinuity of refractive index occurs between the movable mirror 8 and the input optical line A and output optical line B, where by the optical insertion loss with respect to the output optical line B can be reduced.

The cantilever 6 and the electrode 9 are connected to each other by way of a voltage source 11, which applies a voltage between the cantilever 6 and the electrode 9, thus generating an electrostatic force therebetween. The leading end side of the cantilever 6 is attracted toward the electrode 9 due to the electrostatic force and flexes, along which the movable mirror 8 moves toward the electrode 9 while in a state inserted in the groove 4 of the planar waveguide 2 (see FIG. 3). Since the movable mirror 8 is driven while an electrostatic force is generated between the cantilever 6 and the electrode 9 as such, the power can be saved.

Here, the cantilever 6 is provided with the teeth 7 whereas the electrode 9 is provided with the teeth 10, whereby the surface areas of the cantilever 6 and electrode 9 increase in total. Proportionally, the electrostatic force generated between the cantilever 6 and the electrode 9 increases, whereby the voltage applied between the cantilever 6 and the electrode 9 can be lowered.

In a state where the voltage supply from the voltage source 11 is turned OFF in the foregoing optical variable attenuator 1, the cantilever 6 extends straight as shown in FIG. 1. In this state, the light emitted from the input optical line A is totally reflected by the movable mirror 8 so as to enter the output optical line B, whereby a minimal optical attenuation amount can be obtained as an optical attenuator.

When the voltage source 11 applies a voltage between the cantilever 6 and the electrode 9 from such an initial state, the movable mirror 8 moves toward the electrode 9 due to the electrostatic force occurring between the cantilever 6 and the electrode 9. In this state, only a part of the light emitted from the input optical line A is reflected by the movable mirror 8 so as to enter the output optical line B, whereas the rest of light enters the optical line D, whereby the optical attenuation amount increases.

When the voltage applied between the cantilever 6 and the electrode 9 is further raised, the movable mirror 8 completely deviates from the input optical line A and output optical line B as shown in FIG. 3. In this state, the light emitted from the input optical line A totally enters the optical line D without being reflected by the movable mirror 8, whereby the optical attenuation amount is infinite (so-called shutter state).

Thus, in the optical variable attenuator 1, the voltage applied between the cantilever 6 and the electrode 9 is changed, so that the quantity of light reflected by the movable mirror 8 is made variable, whereby the optical attenuation amount is adjusted. Here, the cantilever 6 is provided with the teeth 7, whereas the electrode 9 is provided with teeth 10, whereby the leading end side of the cantilever 6 and the electrode 9 are disposed close to each other. Therefore, the linearity of optical attenuation amount with respect to the applied voltage becomes favorable, which makes it easier to control the optical attenuation amount.

As in the foregoing, since the optical variable attenuator 1 in accordance with this embodiment is configured so as to utilize the light reflected by the movable mirror 8, it is free from influences of light diffraction occurring at edge parts of the movable mirror 8. Therefore, the polarization-dependent loss (PDL) caused by such light diffraction effects) can be suppressed to a low level. Also, it is unnecessary for the edge parts of the movable mirror 8 to become fully thin (e.g., 1 $\mu$m or less) in order to reduce the light diffraction, whereby the movable mirror 8 can be manufactured easily. Further, since only one movable mirror 8 is used, it will be sufficient if only one set of actuator for driving the movable mirror 8 is provided, which simplifies the structure.

Figure 4:
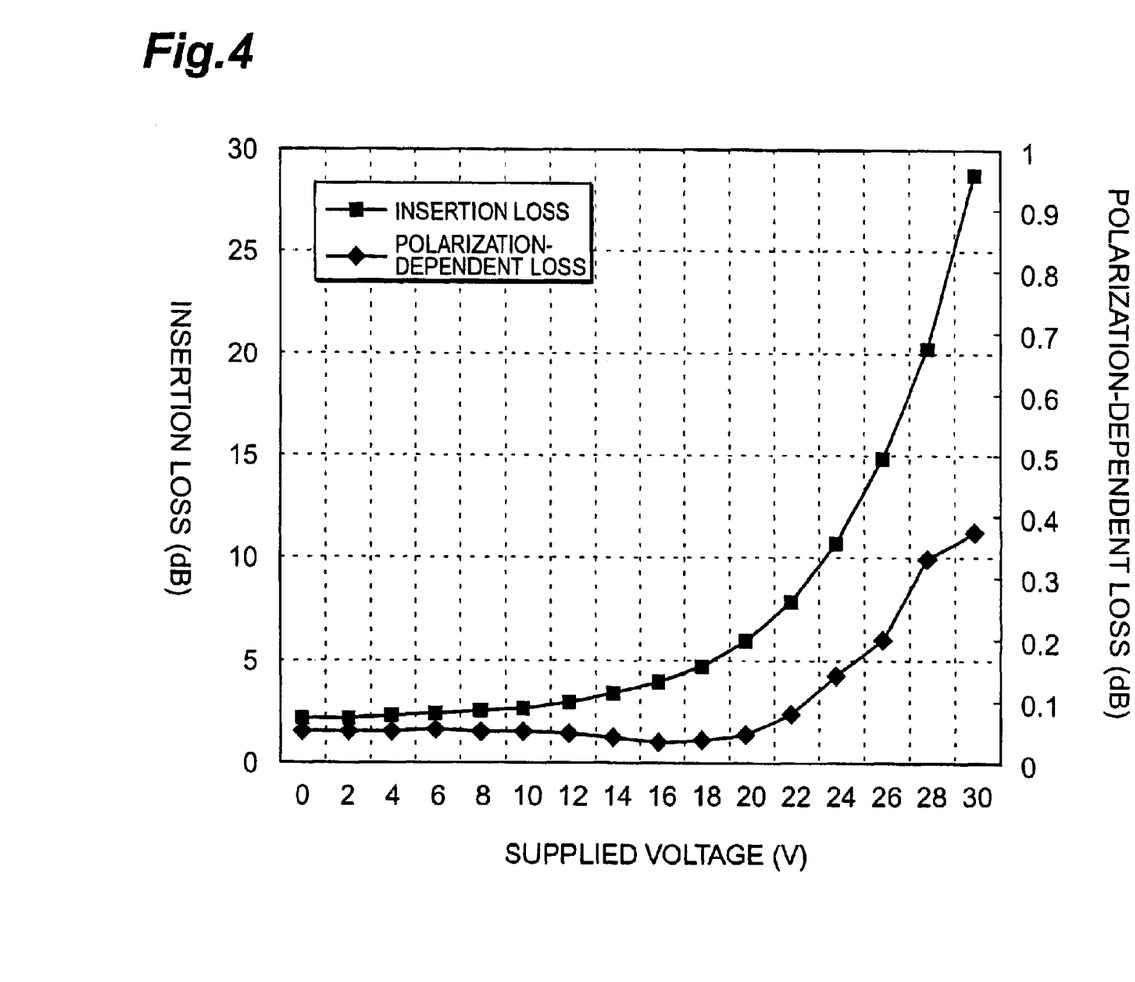
FIG. 4 shows an actually measured data showing the correlation between the insertion loss and polarization-dependent loss in the optical variable attenuator shown in FIG. 1.

FIG. 4 shows actually measured data indicating the correlation between the insertion loss (optical attenuation amount) and PDL in the above-mentioned optical variable attenuator. The abscissa of the actually measured data shows the voltage supplied between the cantilever and the electrode, the left ordinate thereof shows the insertion loss, and the right ordinate thereof shows the PDL. As can be seen from this graph, the PDL at the time of 10 dB attenuation is about 0.15 dB and thus is very low.

Figure 5:
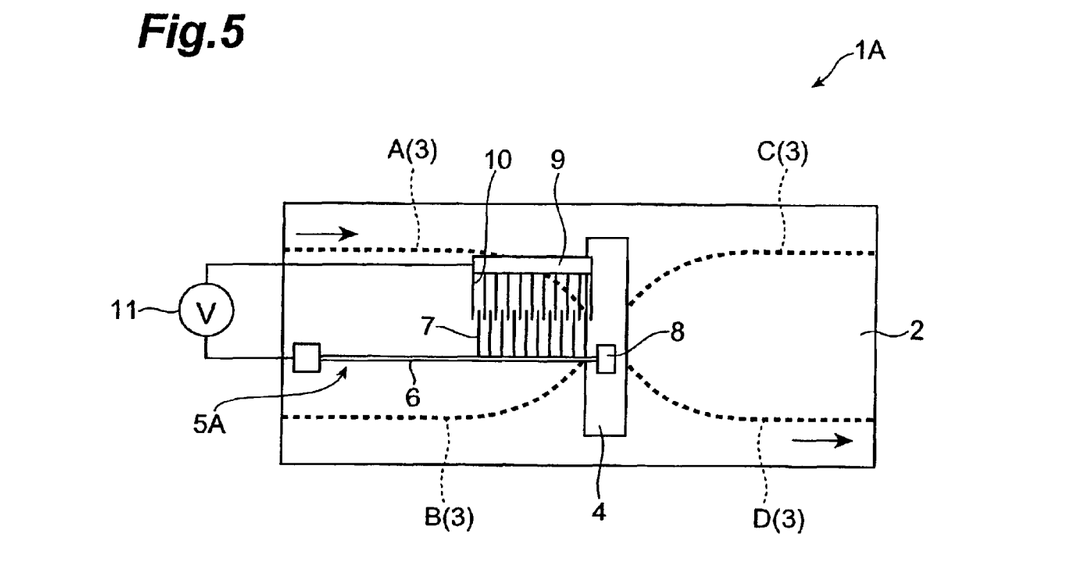
FIG. 5 shows a plan view showing another embodiment of the optical variable attenuator in accordance with the present invention.

FIG. 5 is a plan view showing another embodiment of the optical variable attenuator in accordance with the present invention. In this drawing, members identical or equivalent to those of the above-mentioned embodiment are referred to with numerals identical thereto, without repeating their overlapping descriptions.

In FIG. 5, the optical variable attenuator 1A in accordance with this embodiment has an actuator structure 5A which is equivalent to the actuator structure 5 mentioned above. The actuator structure 5A is configured such that the movable mirror 8 completely deviates from the input optical line A and output optical line B in the initial state. In this state, the light from the input optical line A is not reflected by the movable mirror 8 at all, whereby the optical attenuation amount becomes infinite.

Figure 6:
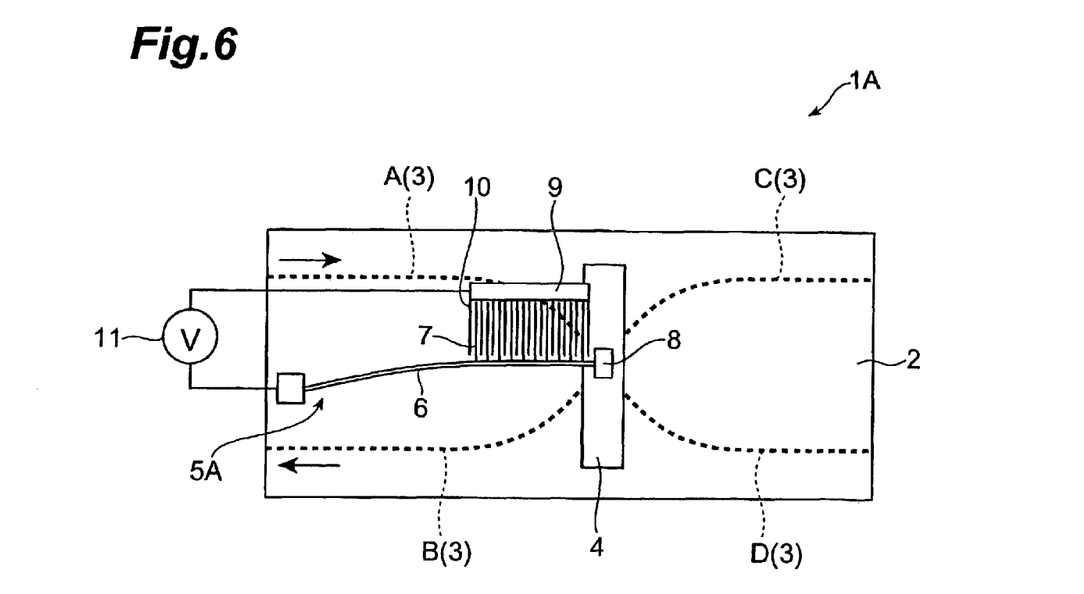
FIG. 6 shows a plan view showing an operating state of the actuator structure shown in FIG. 5.

When the voltage source 11 applies a voltage between the cantilever 6 and the electrode 9 from such an initial state, the electrostatic force occurring therebetween moves the movable mirror 8 toward the electrode 9. In this state, a part of the light from the input optical line A is reflected by the movable mirror 8, so as to be guided to the output optical line B, whereby the optical attenuation amount decreases. When the movable mirror 8 reaches the position shown in FIG. 6, the light from the input optical line A is totally reflected by the movable mirror 8, so as to be guided to the output optical line B, whereby the optical attenuation amount is minimized.

Figure 7:
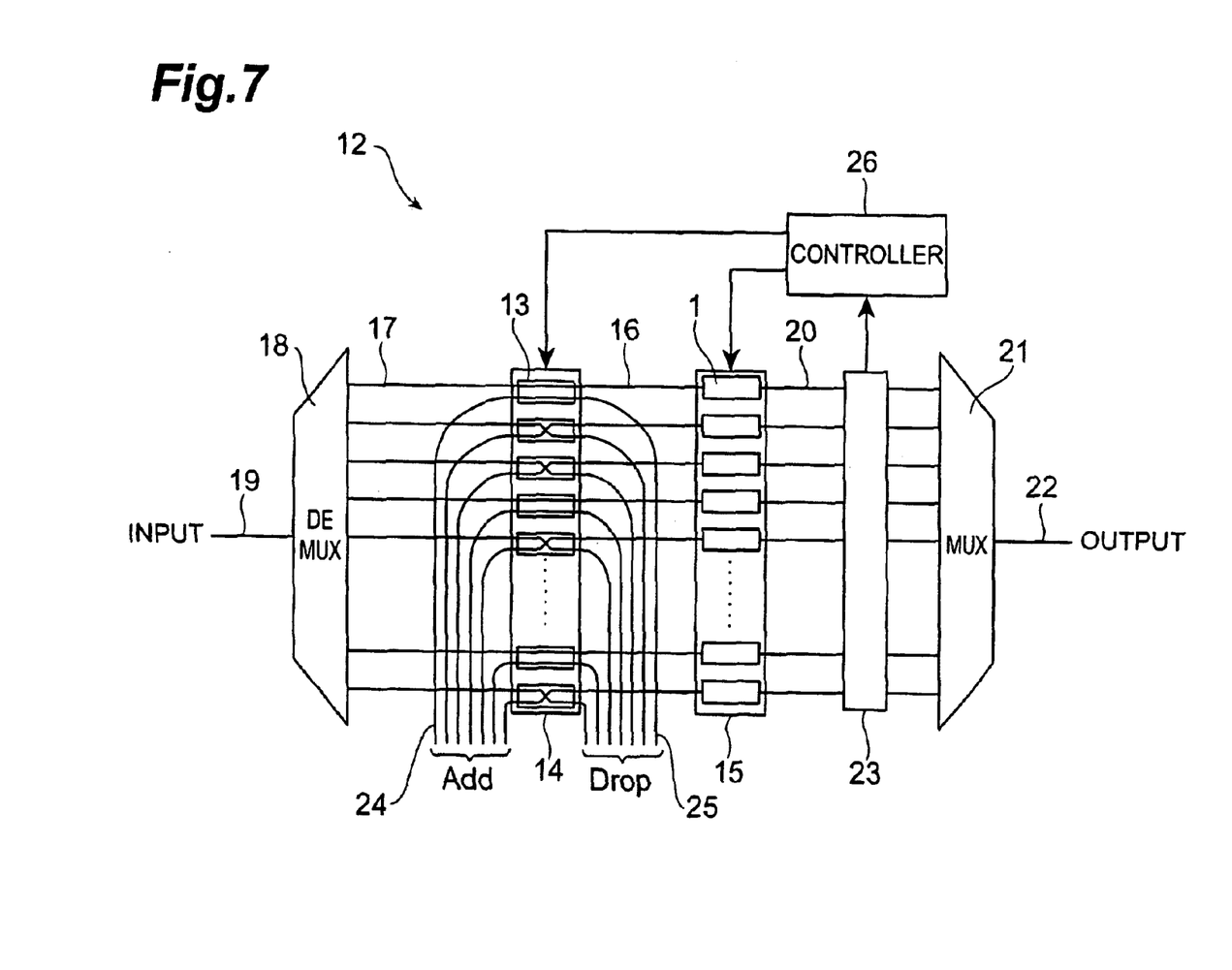
FIG. 7 shows a view showing an example of optical module comprising the optical variable attenuator shown in FIG. 1.

FIG. 7 shows an example of optical module comprising the optical variable attenuator mentioned above. The optical module 12 in this drawing is an optical add/drop multiplexer (OADM) having a function of adding/dropping a signal having a given wavelength from wavelength-multiplexed signals.

The OADM 12 comprises an optical switch array 14 having a plurality of 2×2 optical switches 13 and an optical variable attenuator array 15 having a plurality of optical variable attenuators 1. The individual optical switches 13 and individual optical variable attenuators 1 are connected to each other by way of respective main waveguides 16 (corresponding to the above-mentioned input optical line A). The individual optical switches 13 are connected to a demultiplexer 18 by way of their corresponding main waveguides 17. The demultiplexer 18 demultiplexes a plurality of optical signals with different wavelengths having propagated through a single optical fiber 19 into the respective wavelengths. The individual optical variable attenuators 1 are connected to a multiplexer 21 by way of their corresponding main waveguides 20 (corresponding to the above-mentioned output optical line B). The multiplexer 21 multiplexes the optical signals having their respective wavelengths and guide them into a single optical fiber 22. Each main waveguide 20 is provided with an optical monitor 23 for detecting the power of light attenuated by the optical variable attenuator 1. Also connected to each optical switch 13 are an Add waveguide 24 and a Drop waveguide 25.

The optical switch array 14, optical variable attenuator array 15, and optical monitor 23 are connected to a controller 26. The controller 26 has a plurality of voltage sources for supplying voltages to the respective optical switches 13, and a plurality of voltage sources (mentioned above) for supplying voltages to the respective optical variable attenuators 1. According to the value detected by the optical monitor 23, the controller sends a voltage signal to each optical variable attenuator 1 such that its output light quantity becomes a desirable value. Also, the controller 26 sends a voltage signal to each optical switch 13, thereby carrying out a changeover between optical lines of the waveguides 16, 17, 24, 25.

The present invention is not limited to the above-mentioned embodiments. For example, though the above-mentioned embodiments use an electrostatic actuator which drives the movable mirror 8 by the electrostatic force occurring between the cantilever 6 and the electrode 9, an electromagnetic motor for driving the movable mirror 8 by utilizing an electromagnetic force, and the like may also be used.

Though the above-mentioned embodiments are configured so as to drive the movable mirror 8 in widthwise directions of the planar waveguide 2 across the input optical line A and output optical line B, the movable mirror 8 may also be configured so as to be driven up and down, and so forth.

Though the input optical line A and output optical line B are constituted by the optical waveguides 3 in the above-mentioned embodiments, the present invention is also applicable to cases where the input optical line A and output optical line B are constituted by optical fibers.

Since a movable mirror for reflecting light passing through an input optical line toward an output optical line and driving means for moving the movable mirror are provided, the present invention, while in a simple structure, can reliably reduce the polarization-dependent loss occurring due to the diffraction of light.

The basic Japanese Application No. 2002-194496 filed on Jul. 3, 2002 is hereby incorporated by reference.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical variable attenuator comprising:
    a base member having an input optical line and an output line;
    a movable mirror attached to a support member for reflecting light passing through said optical line toward said output line; and
    driving means for moving said movable mirror,
    wherein said driving means has an electrode supported by said base member, and means for generating an electrostatic force between said support member and said electrode,
    wherein said input optical line and said output optical line are formed by an optical waveguide;
    wherein said base member is provided with a groove connecting with said input optical line and said output optical line; and
    wherein said movable mirror is provided so as to be movable in a state inserted in said groove.

2. The optical variable attenuator according to claim 1, wherein:
    said support member is supported on the base member.

3. The optical variable attenuator according to claim 1, wherein said movable mirror is formed by a microelectromechanical system technology.

4. The optical variable attenuator according to claim 1, wherein said input optical line and said output line form a virtual intersection angle of at least 9 degrees therebetween.

5. The optical variable attenuator according to claim 1, wherein said groove is filled with a matching oil having a refractive index on a par with that of said optical waveguide.

6. An optical variable attenuator comprising:
    a base member having an input optical line and an output optical line;
    a movable mirror for reflecting light passing through said input optical line toward said output optical line; and
    driving means for moving said movable mirror,
    wherein said movable mirror is attached to a cantilever supported on base member; and
    wherein said driving means has an electrode disposed on said base member, and means for generating an electrostatic force between said cantilever and said electrode.

7. An optical variable attenuator according to claim 6, wherein said cantilever is provided with a plurality of first teeth; and
    wherein said electrode is provided with a plurality of second teeth alternately inserted between said first teeth.

8. An optical variable attenuator according to claim 6, wherein said movable mirror, said cantilever, and said electrode are formed from Si having a conductivity; and
    wherein said movable mirror has a surface coated with one of Au, Ag, and Al.

9. The optical variable attenuator according to claim 1, exhibiting a polarization-dependent loss of 0.2 dB or less at an optical attenuation amount of 10 dB.

10. The optical module comprising the optical variable attenuator according to claim 1.

11. The optical variable attenuator according to claim 1, wherein the support member comprises a cantilever.

* * * * *